(12) United States Patent
Wang

(10) Patent No.: US 11,275,451 B2
(45) Date of Patent: Mar. 15, 2022

(54) DEPLOYABLE KEY MOUSE

(71) Applicant: Apple Inc., Cupertino, CA (US)

(72) Inventor: Paul X. Wang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/795,270

(22) Filed: Feb. 19, 2020

(65) Prior Publication Data

US 2021/0255711 A1 Aug. 19, 2021

(51) Int. Cl.
*G06F 3/02* (2006.01)

(52) U.S. Cl.
CPC .......... *G06F 3/0216* (2013.01); *G06F 3/0219* (2013.01)

(58) Field of Classification Search
CPC .............................. G06F 3/0216; G06F 3/0219
See application file for complete search history.

(56) References Cited

U.S. PATENT DOCUMENTS

| | | | | |
|---|---|---|---|---|
| 4,072,840 A * | 2/1978 | Daigle | ..................... | H01H 9/08 200/296 |
| 2004/0190239 A1* | 9/2004 | Weng | ..................... | G06F 1/1616 361/679.2 |
| 2009/0295733 A1* | 12/2009 | Stenbroten | ............ | G06F 3/0219 345/168 |
| 2010/0245250 A1* | 9/2010 | Linegar | ................. | G06F 3/0216 345/168 |
| 2020/0218362 A1* | 7/2020 | Madsen | ................ | G06F 3/0202 |

* cited by examiner

Primary Examiner — Sahlu Okebato
(74) Attorney, Agent, or Firm — Dorsey & Whitney LLP

(57) ABSTRACT

A computer input device can include a housing, a set of key switch mechanisms positioned in the housing, and a removable key structure that is operable between a first configuration positioned in the housing and a second configuration detached from the housing. The removable key can have a position sensor, wherein in the first configuration, the removable key structure is operable to provide a key-based typing input, and, in the second configuration, the removable key structure is operable as a computer pointing device using the position sensor. The removable key structure can therefore allow comfortable, portable, and precise pointer input for a computer input system.

21 Claims, 10 Drawing Sheets

DEPLOYABLE KEY MOUSE

FIELD

The described embodiments relate generally to computer systems and computer input devices. More particularly, the present embodiments relate to a keyboard with a removable key usable as a separate input device.

BACKGROUND

The computer mouse has become an essential component of desktop computing since graphical user interface was popularized in the 1980s with the introduction of the Apple Macintosh. In the succeeding years, the computer mouse has undergone a series of innovations including the addition of a right- and left-click button, a scroll wheel, an optical sensor, a track ball sensor, a laser sensor, and wireless communication to the host computer. A mouse typically incorporates an ergonomic shape to fit comfortably into the hand, which is one factor that has kept its size relatively stable. Handheld mouse input is also well-suited for many types of precise tasks, such as graphic design, computer-assisted design and modeling, and editing large and complex documents.

In some cases, portable computing devices such as laptop and tablet computers benefit from using a peripheral mouse input device. However, the user is then burdened with carrying the separate mouse with the computer, and the separate device can be redundant when the computer already has built-in pointing devices. Accordingly, there is a constant need for improvements and innovations to input devices for computer systems.

SUMMARY

An aspect of the present disclosure relates to a computer input device comprising a housing, a set of key switch mechanisms positioned in the housing, and a removable key structure operable between a first configuration positioned in the housing and a second configuration detached from the housing. The removable key can comprise a position sensor. In the first configuration, the removable key structure can be operable to provide a key-based typing input, and in the second configuration, the removable key structure can be operable as a computer pointing device using the position sensor.

In some embodiments, the removable key structure further comprises an input transducer to detect a user touch on, or movement of, a top surface of the removable key structure. The removable key structure can be positioned in a socket or recess in the housing in the first configuration. The removable key structure can comprise an internal key switch mechanism and a second housing, wherein the internal key switch mechanism can be deflectable relative to the second housing, and the second housing can be detachable from the housing of the computer input device. The removable key structure can comprise a body portion having an expandable side feature. The removable key structure can be detachable from a key switch mechanism of the set of key switch mechanisms. The removable key structure can be detachable from a keycap or subkey connected to the housing.

In some embodiments, the removable key structure can further comprise an internal energy storage device, wherein the internal energy storage device is configured to receive energy in the first configuration. The removable key structure can also further comprise a bottom surface and a spacer configured to separate the bottom surface from a support surface when the removable key structure is in the second configuration.

Another aspect of the disclosure relates to a computer input system comprising a base structure, an input device operable to output an electronic position signal, and a support structure to connect the input device to the base structure. In a first configuration, the input device can be coupled to the support structure, and a force applied to a top surface of the input device can deflect the input device relative to the base structure. In a second configuration, the input device can be detached from the support structure, and the input device can be operable to output the electronic position signal.

In some embodiments, the input system can further comprise a switch, wherein the force applied to the top surface of the input device actuates the switch upon deflection of the input device relative to the base structure. The input device and the support structure can also be coupled by a magnetic structure attracting the input device to the support structure. The support structure can comprise a key stabilizer reversibly attachable and detachable to the input device. The support structure can comprise a keycap reversibly attachable to, and detachable from, the input device.

In some embodiments, application of an off-center force to the top surface of the input device can separate the input device from the support structure. If the input device deflects relative to the base structure below a threshold distance, the input device can be locked to the support structure when the force is removed, and if the input device deflects relative to the base structure at or above the threshold distance, the input device can be unlocked from the support structure when the force is removed.

Yet another aspect of the disclosure relates to a computer input system that comprises a keyboard apparatus including a housing, a set of key switch mechanisms positioned in the housing, a controller in electronic communication with the set of key switch mechanisms, and an input device removably attachable to the housing among the set of key switch mechanisms. The input device can include a body and a sensor positioned in the body, wherein in a first configuration of the input device, the input device is attached to the keyboard apparatus and output of the sensor is registered by the controller as a first input type, and wherein in a second configuration of the input device, the input device is positioned spaced away from the keyboard apparatus and output of the sensor is registered by the controller as a second input type.

In some embodiments, the first input type can be a position or movement of an appendage of a user relative to the sensor. The second input type can be a position or movement of the body of the input device. The first input type can be a key-based typing input and the second input type can be a mouse click.

BRIEF DESCRIPTION OF THE DRAWINGS

The disclosure will be readily understood by the following detailed description in conjunction with the accompanying drawings, wherein like reference numerals designate like structural elements, and in which:

FIG. 2A shows a partial and simplified isometric view of an alternative embodiment of a removable input device.

FIG. 2B shows a partial and simplified side view of an alternative embodiment of a removable input device.

DETAILED DESCRIPTION

Figure 1:
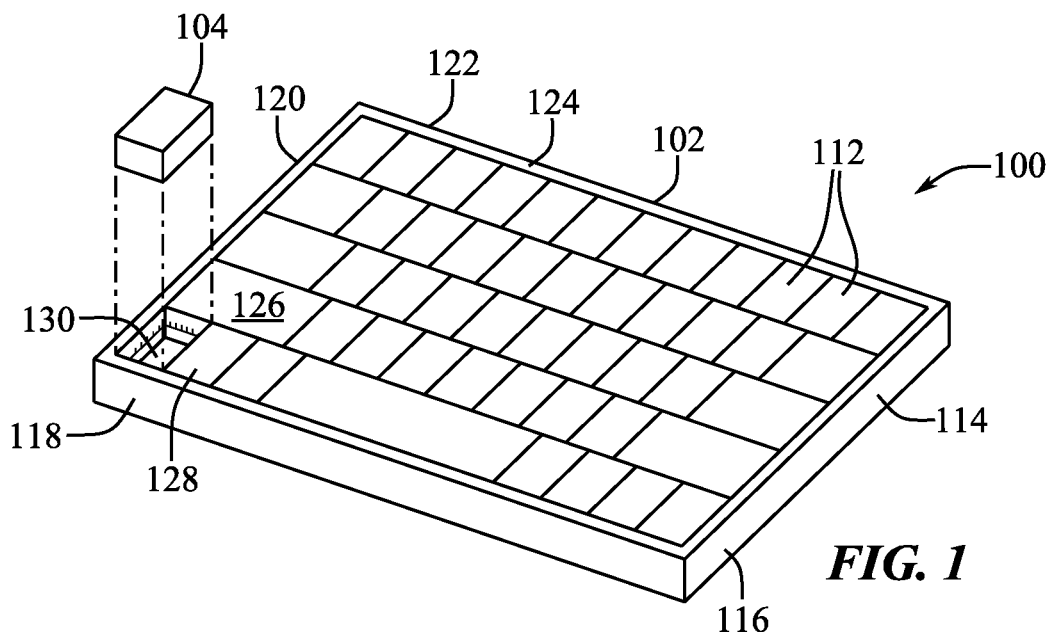
FIG. 1 shows an isometric, partially-exploded view of a computer input device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Trackpads, pointing sticks (e.g., "eraser head" mice), trackballs, and similar pointing devices for computer equipment can be difficult and straining to use over long periods of time and for certain types of work with a computer. Additionally, trackpads, pointing sticks, and trackballs take up valuable space in portable electronic devices that have constantly dwindling size and thicknesses. A sliding handheld mouse is generally more comfortable for fine pointer operations or extended use, but handheld mice are also large, are of limited portability, or require particular work environments (e.g., ones with a proper mouse tracking surface) to be used effectively.

Accordingly, aspects of the present disclosure relate to input devices where a keyboard is provided that has at least one deployable and removable input device that is specialized for input similar to a handheld mouse, stylus, wand, or other remote, handheld input to a computing device when the deployable input device is separated from the keyboard. For example, the specialized key can be removable from the keyboard and can comprise input and sensor features configured to receive a "click" input from a user and to track the position or movement of the deployed key as it moved across a tracking surface. In some embodiments, the removable key is operable between a first configuration wherein it is usable as a key having a first function when attached to or positioned in the housing of the keyboard, such as a key switch input function, and having a second configuration with a second function when separated from the housing, such as a mouse input function.

Accordingly, the removable key can comprise features and elements that enable the key to operate as a mouse or other remote input device, such as an optical tracking sensor configured to face and sense the position or movement of a surface below the optical tracking sensor. The key can also have a button, touch sensor, or similar structure for sensing a click input from a user.

In some embodiments, the computer input device can have a base structure (e.g., a housing for a keyboard), an input device (e.g., a key) operable to output an electronic position signal (e.g., a signal from an optical position tracker, an inertial measurement unit, etc.), and a support structure or key switch mechanism to connect the input device to the base structure (e.g., a hinge, scissor mechanism, butterfly mechanism, or similar structure with or without a supporting subkey). In a first configuration, the input device can be coupled to the support structure and a force applied to the top surface of the input device can deflect the input device relative to the base structure. In some embodiments, this deflection can be registered by a controller as a key input. In a second configuration, the input device can be detached from the support structure, and the input device can be operable to output the electronic position signal, such as by indicating a location or movement of the input device relative to a reference surface or reference direction (e.g., relative to a gravitational direction).

Furthermore, some aspects of the disclosure relate to a computer input system having a keyboard apparatus with a controller and an input device that is removably attachable to a housing of the keyboard apparatus among other key switch mechanisms. The input device can have a sensor within its body that can output a signal that is registered as a first input type (e.g., a key make) when in a first configuration and that can be registered as a second input type (e.g., a mouse click) when in a second configuration spaced away from the keyboard apparatus.

These and other embodiments are discussed below with reference to FIGS. 1 through 19. However, those skilled in the art will readily appreciate that the detailed description given herein with respect to these figures is for explanatory purposes only and should not be construed as limiting.

Figure 1A:
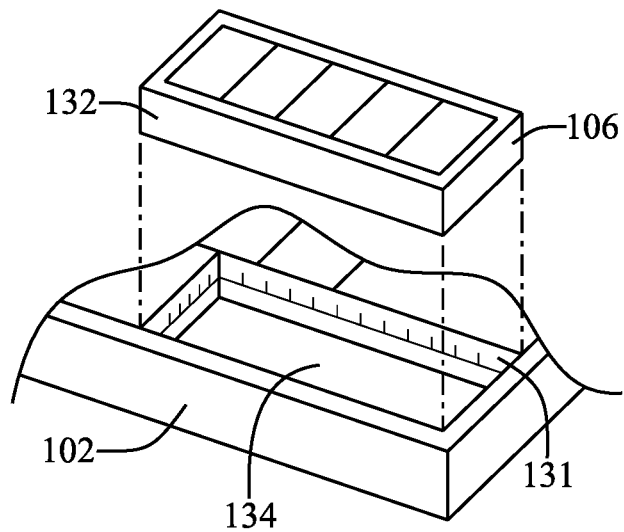
FIG. 1A shows a partial and partially-exploded view of an alternative embodiment of a computer input device.
Figure 1B:
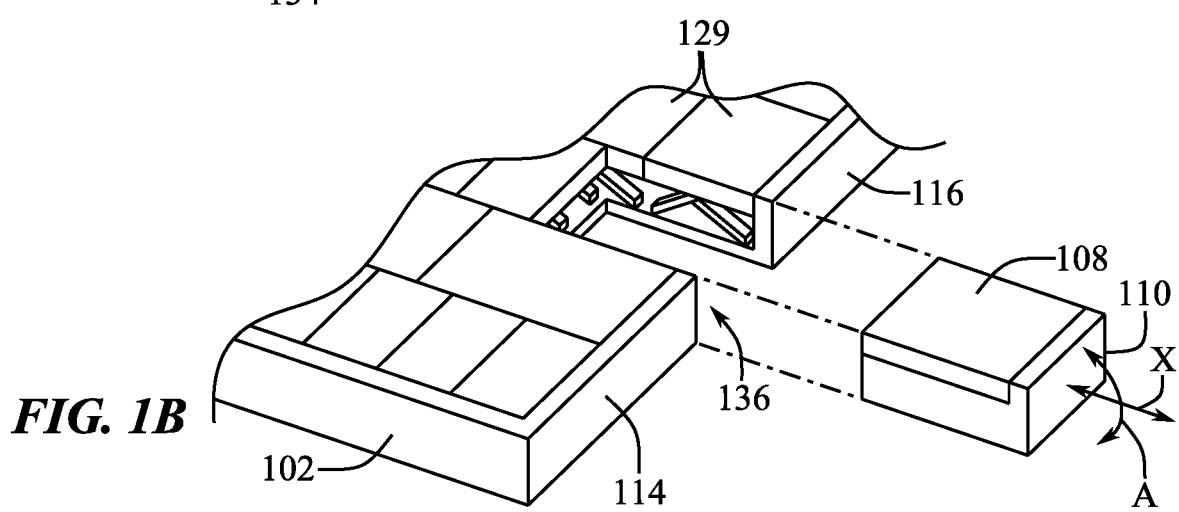
FIG. 1B shows a partial and partially-exploded view of an alternative embodiment of a computer input device.

FIG. 1 shows an isometric view of a computer input system 100 according to an embodiment of the present disclosure wherein a keyboard 102 has a removable key 104 (i.e., a removable or deployable key structure). FIG. 1A shows a partial view of an embodiment of the system 100 of FIG. 1 wherein a deployable set of keys 106 is removable from the keyboard 102. FIG. 1B shows another partial view of an embodiment of the system 100 of FIG. 1 wherein a key 108 and its own independent housing 110 are removable from the keyboard 102, and wherein the independent housing 110 fits alongside and fills a gap or opening through or within the housing 114 of the keyboard 102.

Accordingly, as shown in FIG. 1, the input system 100 can comprise a keyboard 102 with a set of fixed keys (e.g., key switch mechanisms/keys 112) positioned in or attached to a housing 114. At least one removable key 104 can be mounted to the housing 114 or one of the fixed keys. The removable key 104 can be used as a separately-movable input device and can be used to provide input that is different in nature from the keyboard 102.

The keyboard 102 is shown with a reduced-size form factor in FIG. 1, but in various embodiments, the keyboard 102 can comprise more or fewer keys, such as, for example, a tenkeyless layout, full-size layout, numpad or "tenkey" layout, 60 percent, 65 percent, 75 percent, ergonomic or split hand layout, or another variation of keyboard layout. Thus, the keyboard 102 of FIG. 1 is shown as an illustrative example of one of many possible keyboards that could be used with a removable input device.

The keyboard 102 can be a keyboard for a computing device (not shown) such as a desktop, laptop, or tablet computer and can be configured to provide key-based typing input to the computing device. In some embodiments, the keyboard 102 is part of the computing device, such as by being built into a chassis or enclosure of a laptop or tablet device. The housing 114 can therefore be a standalone, peripheral housing or can be integrated into a housing for other computer components (e.g., batteries, processor, memory, etc.). In some embodiments, the keyboard 102 can comprise a wired or wireless interface for electrical communication with an external or connected computing device. The keyboard 102 can also comprise a connection to a power source such as an external power source (e.g., power provided by a port of a computer or an internal battery) or an internal power source (e.g., a battery within the keyboard 102).

As used herein, "key-based typing input" refers to the type of input provided using a conventional keyboard, wherein each one of the keys (e.g., 112) is configured with at least two input states, with those input states including a first state in which a first signal (or no signal) is produced, and the key is at rest, and a second state in which a second signal is produced, and the key has been actuated and produces or triggers a keycode at a keyboard controller. This type of input can be transduced by a series of switches (e.g., deflecting conductors paired with collapsible domes) that are actuated when a key is pressed and are unactuated when the key is released. In some embodiments, the keys 112 are configured to provide binary (i.e., on/off) signal output to a controller (e.g., a keyboard controller or computer controller). In some cases, the keys 112 can provide a range of output signals (e.g., signals that correspond to force applied to a key or that correspond to a range of different deflection amounts of the key).

The removable key 104 can be positioned in the keyboard 102 among the other keys (e.g., 112). In this manner, the removable key 104 can be positioned adjacent to a neighboring key or set of neighboring keys with the same spacing that is applied to other keys of the keyboard 102. In some embodiments, the removable key 104 is positioned in a standard position in the keyboard 102, wherein the removable key 104 replaces or stands in place of a key in a conventional keyboard layout. As shown in FIG. 1, the removable key 104 can be positioned where a conventional left "CTRL" key is located. Thus, the removable key 104 can be positioned in an extreme bottom corner of the keyboard 102. In another example embodiment, the removable key 104 can be located in another corner of the keyboard, in a central part of the keyboard, or on an edge of the keyboard. In some embodiments, the removable key 104 can replace one or more keys elsewhere on the keyboard 102, such as an "ESC" key, "ENTER" key, "SHIFT" key, "F" or "J" homing key, "ALT" key, "COMMAND" key, "SPACEBAR" key, etc. In some embodiments, it can be beneficial for the removable key 104 to replace or cover a large key (i.e., greater than one keyboard key size unit) in the keyboard 102 so that the removable key 104 has a larger body to grasp by the user and so that the key 104 has more volume for storage of its own internal components. See FIG. 2.

In some embodiments, the removable key 104 can be positioned within the housing 114 of the keyboard 102. Thus, the key 104 can be located between side walls 116, 118, 120, 122 of the housing 114. For a keyboard 102 with a generally horizontal rectangular key input area (e.g., as defined by the keys shown in FIG. 1), the removable key 104 can be positioned within the perimeter of the rectangular area. In some embodiments, the keys (e.g., 104, 112) can be "floating" or otherwise protrude above the top surface 124 of the housing. Accordingly, the removable key 104 can be considered "within the housing" when it is attached to the housing and positioned among other keys of the housing. In some embodiments, the removable key 104 has other keys positioned next to it in at least two perpendicular directions (e.g., keys 126, 128). In some embodiments, the removable key 104 (or a removable structure of FIGS. 1A-1B) can be retained to the housing 114 until it is released or deployed by the user pressing a button or other key (e.g., keys 126, 128 or a button on a side (e.g., 118) of the housing 114).

In some embodiments, the removable key 104 is positionable in a recess 130, socket, or receptacle in the housing 114. In some cases, the removable key 104 is positionable upon a key or support structure that is positioned in the recess 130, even if the removable key 104 itself is not within the recess 130. See, e.g., FIG. 9. The recess 130 can hide and protect the sides or bottom of the removable key 104, its support structures, and electrical charging or control features of the removable key 104 or keyboard 102. See also FIGS. 8, 9, 13, 14, and 15. The recess 130 can be a recess having a bottom surface or base structure that is positioned below and faces the removable key 104 when the removable key 104 is coupled to the keyboard 102. See, e.g., FIGS. 8, 9, 13, and 14. In some embodiments, the recess 130 can instead be a through-hole that does not have a bottom surface below the removable key 104, wherein the bottom surface of the removable key 104 faces a support surface below the keyboard 102. See FIG. 15. In some cases, the recess 130 can have lateral sides that are open to the supporting structures of neighboring keys (e.g., as shown below keys 129 in FIG. 1B). In other cases, the sides of the recess 130 can be covered by a barrier or can have a sidewall or web structure (e.g., 131 in FIG. 1A). The barrier, sidewall, or web structure can prevent intrusion of invasive materials (e.g., debris or fluids) beneath other keys, can improve the aesthetic appearance of the recess 130, and can improve the rigidity of the housing 114 at the recess 130.

The removable key 104 can be removable from the keyboard 102 by removing a key or a portion of a key assembly, as shown in FIG. 1. In some cases, the key or portion of the assembly is removable in a vertical direction from the keyboard 102, as also shown in FIG. 1. In some embodiments, the key or portion of the assembly can be removed horizontally from the keyboard 102 (e.g., similar to FIG. 1B) or is removable by rotation away from the keyboard 102 (e.g., similar to FIG. 9). In some embodiments, when the removable key 104 is removed, a subkey or other structure positioned below the position where the removable key 104 was removed can be operated to provide key-based typing input in the absence of the removable key 104. See also FIGS. 9-10 and their related descriptions herein.

As shown in FIG. 1A, a set of keys 106 can be removable from the keyboard 102 and utilized as a remote input device. The set of keys 106 can comprise their own housing 132 and their own individual support structures positioned in the housing 132 (e.g., their own switches, stabilizers, movements mechanisms, internal light source, etc.). Thus, each key of the set of keys 106 can be operated independently when they are positioned in the housing 114 or when they are removed from the housing 114. In this manner, the set of keys acting as a remote input device 106 can have multiple different buttons that provide different operations or functions. The inclusion of multiple keys and a separate housing 132 can also increase the amount of available volume for components of the removable input device and for grasping by the user. The housing 132 can be attachable to the housing 114 in a recess 134. When the housing 132 is attached to the keyboard housing 114, it can be stationary or can be translatable relative to the keyboard housing 114. For example, the housing 132 can itself be operated as a key for key-based typing input. The recess 134 below the set of keys 106 can have similar functions and structures as the recess 130 below removable key 104. The set of keys 106 can be incorporated in other embodiments of input devices disclosed elsewhere herein.

The embodiment of FIG. 1B shows that a single removable key 108 can comprise its own housing 110, and that that housing 110 can be configured to fit within and as a part of the housing 114 of the keyboard 102. For example, the housing 114 can have a receptacle 136 to receive the housing 110, and the outer edges and surfaces of the housing 110 can follow the shape and contour of the outer edges and surfaces of the housing 114 when the removable key 108 is attached to the keyboard 102. The embodiment of FIG. 1B can conveniently be detachable from the keyboard 102 by rotating the removable key 108 relative to the housing 114 (e.g., as indicated by arrow A) or by translating the removable key 108 (e.g., as indicated by axis X). In some embodiments, the key 108 can be removed by moving it vertically (similar to the direction of the broken lines for key 104 shown in FIG. 1). See also FIG. 15 and its related description below.

The removable keys 104, 106, 108 can be beneficially stored and carried by the keyboard 102 while the keyboard 102 and keys 104, 106, 108 are in a typing configuration, wherein all keys (including keys 104, 106, 108) are configured to provide key-based typing input. In this state, the keyboard 102 as a whole can be highly portable and compact as compared to devices where a keyboard and trackpad, peripheral mouse, or other pointing device are used together. Accordingly, the keyboard 102 can be efficiently implemented in the small body constraints of laptops and other portable electronic devices to provide key-based typing input, yet the keyboard 102 can also be reconfigured (via the removable keys 104, 106, 108) to provide the functionality that a peripheral mouse provides, as explained in further detail below.

Figure 2:
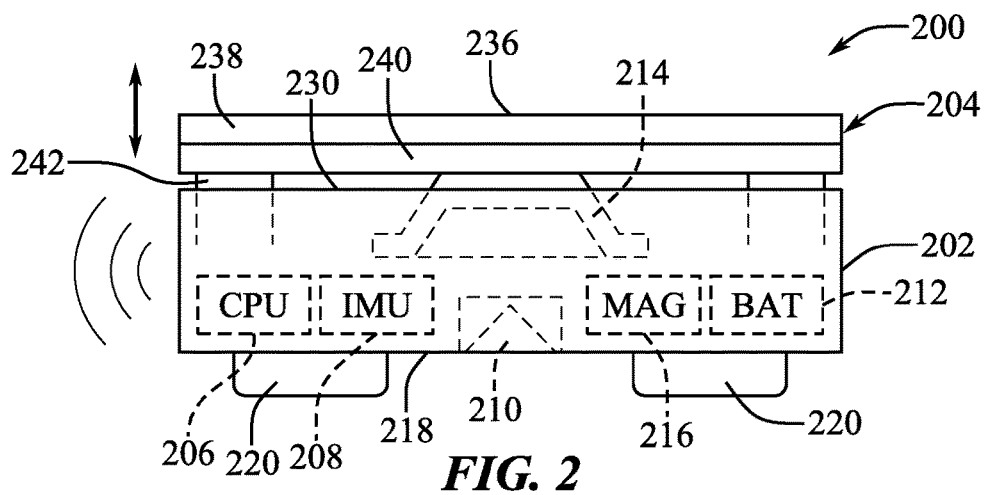
FIG. 2 shows a simplified, diagrammatic side view of a removable input device.

FIG. 2 shows a diagrammatic side view of a removable input device 200 configured to be reversibly attached and detached from a keyboard (e.g., keyboard 102). The removable input device 200 can correspond to removable key 104 of input system 100, and features and elements of removable input device 200 can be implemented in the other removable keys 106, 108 of FIGS. 1A and 1B. The removable input device 200 can comprise a body or housing 202 and a top button 204 (or top input device). The housing 202 can contain a set of electronic components such as, for example, a processing and control unit 206, an inertial measurement unit 208, an optical sensor 210, a battery 212, and a switch 214. In some embodiments, a magnetic structure 216 is also located in the housing 202. While not specifically shown, the removable input device may also include sensors, actuators and other devices configured to provide haptic or sensory feedback (e.g., vibration or force feedback) to a user. The housing 202 can comprise a bottom surface 218 to which one or more bottom support pads 220 or spacers can be attached. The simplified diagram of FIG. 2 has exaggerated proportions in order to preserve clarity in the description of the parts. Additionally, electronic components in this and other figures herein can have electrical connections (e.g., to power sources, controllers, etc.) as needed to function in harmony with their descriptions herein. In some embodiments, the input device 200 can comprise an audio input sensor (e.g., a microphone) configured to sense audio input that can be relayed to a connected computing device. For example, the input device 200 can be used to receive and record or transmit sounds and voices (e.g., whispers) to provide input to the computing device. Positioning an audio input sensor on the input device 200 can beneficially help the user provide audio input from a location that is remote from the rest of the keyboard (e.g., near their mouth) to reduce the amount of background noise or to reduce the required sound volume to record the input.

FIG. 2A shows that in some embodiments, the housing 202 can comprise a side surface 222 that can include a retractable body portion 224. The retractable body portion 224 can be extendable from the side surface 222 to increase the size of the housing 202, as indicated by numeric indicator 226, which shows an extended configuration relative to the housing 202. The body portion 224 can therefore alternatively be referred to as an expandable side feature of the housing 202. The body portion 224 can therefore be deployable from the side surface 222 of the housing 202 to increase the graspable size of the removable input device 200 or to make space within the removable input device 200 (e.g., for operational movement of the top button 204 or movable bottom supports (see FIGS. 2B-2C)). In some embodiments, the retractable body portion 224 can be automatically deployed upon removal of the removable input device 200 from a housing (e.g., 114), subkey, charger, or other part of a keyboard (e.g., 102). In some embodiments, the housing 202 can comprise multiple retractable body portions 224 positioned on one or multiple sides of the housing 202, thereby allowing the removable input device 200 to expand in size in multiple directions. In some embodiments, the removable input device 200 can comprise a retractable body portion 224 with an extendable or expandable central feature 1706 on a top or bottom surface of the housing 202 so that the removable input device 200 is expandable in multiple different directions (e.g., in two directions that are perpendicular to each other), thereby increasing the height and width, or the width in multiple directions, simultaneously.

The retractable body portion 224 can comprise a "push-push" mechanism, wherein when the retractable body portion 224 is in the state shown in solid lines in FIG. 2A, application of an inward-directed force against the outer surface 228 thereof can release a mechanism within the retractable body portion 224 and allow the body portion 224 to translate out to the position shown in broken lines in FIG. 2A (i.e., 226). Application of an inward-directed force against the outer surface 228 while in the position shown by numeric indicator 226 can cause the mechanism to re-latch to the position shown by numeric indicator 226. Accordingly, a user can push the outer surface 228 to release and can also push the outer surface 228 to retract the retractable body portion 224.

In some embodiments, the push-push mechanism can be operated based on deflection. For instance, if the retractable body portion 224 deflects relative to the housing beyond a threshold distance, the body portion 224 can be in the retracted position (i.e., 224) when an inward-directed force is removed from the body portion 224. If the body portion 224 deflects relative to the housing 202 at or above the threshold distance, the body portion can be unlocked and can extend from the housing (e.g., to the position indicated by 226).

In some embodiments, the retractable body portion 224 can be operable as a button, wherein the retractable body portion 224 is configured to extend from the side surface 222 unless it is depressed and deflected toward or into the housing 202, and the deflection/depression can be sensed or can trigger a signal for the removable input device 200. In some embodiments, the retractable body portion 224 can therefore provide an input location on the removable input device 200 in addition to the top button 204. In some embodiments, the retractable body portion 224 can be positioned and extendable from the bottom surface 218 or top surface 230. See FIG. 2. For example, the retractable body portion 224 can be a bottom support pad 220 or top button 204.

The bottom support pads 220 can extend from the bottom surface 218 to space the bottom surface 218 away from a support surface (e.g., a desktop or tabletop) positioned below the removable input device 200. Thus, the support pads 220 can prevent the housing 202 from being scratched or soiled by contact with the support surface. The bottom support pads 220 can comprise a durable material such as a rubber or durable polymer (e.g., thermoplastic polyurethane (TPU), delrin, or nylon) to help prevent the support pads 220 from being damaged by the support surface.

The bottom support pads 220 can be spaced apart from each other (or can have an opening) to accommodate and leave an open space for the optical sensor 210. In some embodiments, a single bottom support pad 220 is positioned on the housing 202, and it comprises a shape or opening configured to ensure that the pad 220 does not cover the optical sensor 210 or obscure light or other signals emitted from (or received by) the sensor 210.

In some embodiments, the bottom support pads 220 can have a consistent shape while the removable input device 200 is being used. Accordingly, the material used in the support pads 220 can be firm. This configuration can be beneficial when the input device 200 is used on a hard, planar surface. In some embodiments, the input device 200 can be used on an irregular or rougher surface 231, and a compliant bottom support pad 232 can be used. See FIG. 2B. The compliant bottom support pad 232 can continuously conform to the shape of the surface 231 on which it is placed in order to smooth and keep level the movement of the input device 200 across the surface 231. In another embodiment, a set of rollers 234 can be positioned in the bottom surface 218 and can be rotatable within the bottom surface 218 to provide rolling support for the housing 202. See FIG. 2C. In some cases, the rollers 234 can be translatable in a direction perpendicular to the bottom surface 218, such as in a direction along axis B. In this case, the rollers 234 can dynamically adjust to the texture or surface features of the support surface (e.g., 231) as the housing 202 moves substantially level and horizontally across the support surface.

Figure 2C:
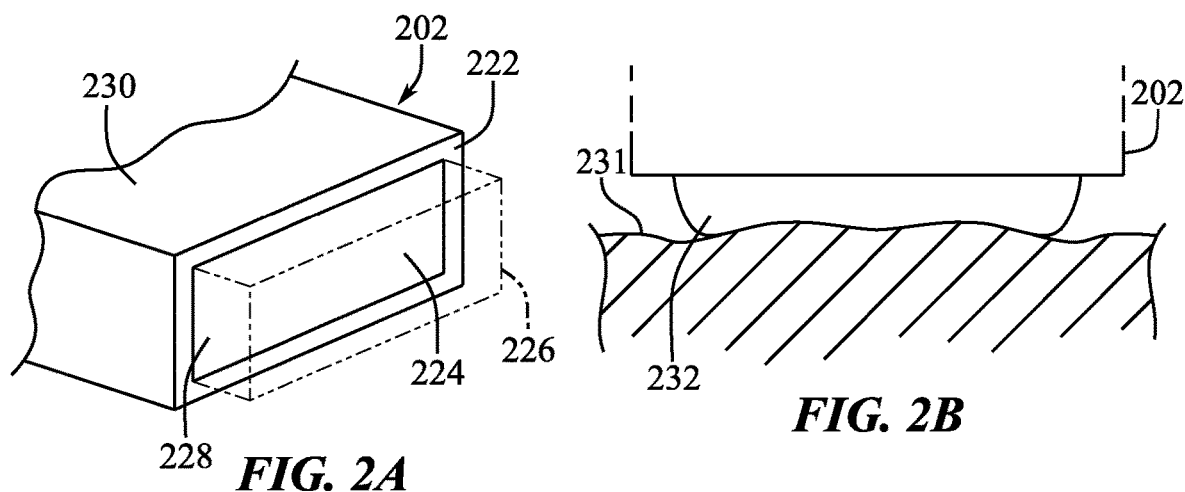
FIG. 2C shows a partial and simplified side view of an alternative embodiment of a removable input device.
Figure 2C:
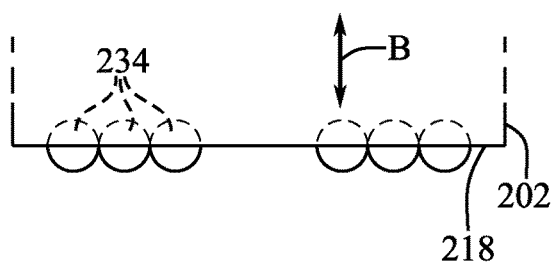
Figure 3:
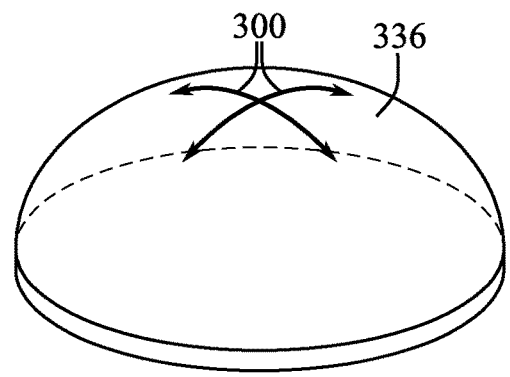
FIG. 3 shows an isometric view of a top portion of a removable input device.

The embodiments of FIGS. 2B and 2C can be beneficially used with a removable key (e.g., 104) of the keyboard 102 in order to allow the removable key to be used with the keyboard keys (e.g., 112) and housing 114 as the support surface. In other words, the user can operate the deployable input device by moving it across and keeping it in contact with the keys of the keyboard 102. In this case, the rollers 234 or compliant bottom support pad 232 can conform to the shape of the keys (e.g., 112) in order to smooth out the motion of the deployable input device as it moves over the keys and their housing. This configuration can be beneficial to take advantage of the large surface area of the keyboard for tracking a mouse and thereby allowing other parts of the keyboard or computer housing to be used for other functions.

Referring again to FIG. 2, the top button 204 can comprise a top surface 236 to receive user input. The top surface 236 can be substantially planar, but in some cases can have surface features to improve the finger feel, definition, or registry of edges or center of the keys. For example, the top surface 236 can be concave, recessed, textured, or ridged. In some embodiments, the top surface 236 can be convex, as shown by surface 336 in FIG. 3. A convex top surface 336 can be positioned on a rectangular key housing 202 or on an elliptical or cylindrical housing 202. A concave or convex top surface 236, 336 can beneficially have increased surface area as compared to a flat, planar top surface and can therefore provide additional surface area against which a user can provide touch or sliding input to the removable input device 200, as indicated by bidirectional arrows 300. In some embodiments the top button 204 extends across the entire top of the housing 202, and in some cases the top button 204 can extend partially across the housing 202 (e.g., when other keys of a set of keys 106 are included in the housing 202).

As shown in FIG. 2, in some embodiments, the top button 204 can comprise a top plate 238 and a touch sensor 240 attached to the top plate 238. The top plate 238 can be a rigid and durable structure configured to receive touch input and pressure from a user object (e.g., a finger or other body appendage). The touch sensor 240 can be configured to detect the presence or position of the user object on the top surface 236 of the top plate 238. For instance, the touch sensor 240 can be a capacitive touch sensor configured to detect a change in capacitance caused by the presence of the user object (e.g., a user finger) near the touch sensor 240 (e.g., on the top surface 236). The touch sensor 240 can therefore be used to detect a tap or press of a user object against the top surface 236 and can produce a signal that can be used to electronically indicate that a user has provided an input to the top surface 236. The input can be determined to be a mouse button press (i.e., a "click") or similar input when the removable input device 200 is separated from its host keyboard 102. When the input device 200 is attached or mounted to the keyboard 102, the signal from the touch sensor 240 can indicate a key-based typing input (e.g., a keycode such as "Ctrl" or "Enter").

Furthermore, in some embodiments, the touch sensor 240 can be used to detect the position of the user object relative to the top surface 236, such as by determining the location of the user object on the top surface 236 in two or three dimensions. A user object can therefore touch one side of the top surface 236 to produce a first signal via the touch sensor 240 and can touch a second side of the top surface 236 to produce a second signal via the touch sensor 240. Alternatively, the touch sensor 240 can be used to track the position of the user object over time, such as by detecting a swiping or sliding movement of the user object across the top surface 236. These features can allow the input device 200 to have multiple input functions, including, for example, a "left click", "right click", and scroll or gesture input. In some embodiments, these location-based or time-based inputs can be ignored or reinterpreted as a different input (e.g., key-based typing input) while the input device 200 is attached or mounted to a host keyboard 102. In some cases, these inputs can be enabled while attached to the keyboard 102 in addition to providing key-based typing input for certain types of sensor outputs. Accordingly, the input device 200 can provide functionality that either matches or differs from other keys of the keyboard 102 while the input device 200 is depressible or actuatable as a key of the keyboard 102.

In some embodiments, the top plate 238 and touch sensor 240 can be configured to vertically translate relative to the housing 202, as indicated by the vertical double-sided arrow in FIG. 2. The input device 200 can comprise a stabilizer 242 or button guide to orient the top button 204 as it moves relative to the housing 202. In some embodiments, the stabilizer 242 can stabilize movement of the top surface 236 so that it remains parallel to the bottom surface 218 or the top end of the housing 202 as it translates relative to the housing 202.

The switch 214 can comprise a transducer for detecting movement of the top button 204 relative to the housing 202. As shown in FIG. 2, the switch 214 can comprise a collapsible dome switch, such as a rubber or metal dome configured to output a signal to the control unit 206 when the switch 214 is compressed, buckles, collapses, or deflects. In some embodiments, the switch 214 can deflect to cause contact between two conductive members within the housing 202, and that contact can produce a signal sent to the control unit 206. In some embodiments, the switch 214 can be used to transduce a button press of the top button 204 (e.g., a mouse click), and the touch sensor 240 can be used to detect the location of contact between the top surface 236 and a user object or sliding movement across the top surface 236. Accordingly, the switch 214 and touch sensor 240 can be used in tandem to detect or transduce different types of user inputs to the input device 200.

The processing and control unit 206 can comprise a processor, memory, electronic data storage, input/output adapters, and related components connected to the various other electrical devices in the input device 200. In some embodiments, the control unit 206 can comprise an electronic communications adapter, such as a wireless electronic communications adapter, to send and receive signals from the input device 200 to an external computer or controller such as a controller of the keyboard 102 or a controller of a computer for which the input device 200 is used as a mouse, trackpad, or similar pointing device. Wireless electronic communications capability of the input device 200 is symbolized by the wave symbol on the left side of the housing 202. Alternatively, a wired connection can link the input device 200 to its host keyboard.

The inertial measurement unit 208 can comprise a set of sensors used to track the position or orientation of the input device 200 relative to a reference point, axis, or plane. For example, the inertial measurement unit 208 can comprise an accelerometer, gyroscope, magnetometer, or combinations thereof that track the acceleration and movement of the input device 200. In some embodiments, the inertial measurement unit 208 can use a gravitational direction as a reference axis or direction. In some embodiments, a starting point in space can be used as a reference point. In some embodiments, the inertial measurement unit 208 can use a support surface as a reference plane, such as a surface against which the bottom support pads 220 are resting. The inertial measurement unit 208 can therefore produce signals that indicate movement of the input device 200 in multiple degrees of freedom, and that information can be used to determine where or how much to change a graphical user interface on a computing device to which the input device 200 is connected. For example, translation or rotation of the input device 200 can be detected by the inertial measurement unit 208 and can be converted into a movement of a cursor or graphical object depicted on a display screen connected to a controller in communication with the input device 200. In this manner, the input device 200 can be moved by a user in order to provide input to a computing device.

In some embodiments, the orientation of the input device 200 can be used to affect the type of signal output by the input device 200. For example, if the input device 200 is oriented with the bottom surface 218 facing gravitationally downward or toward a support surface, the signals of the optical sensor 210 can be used to indicate the position of the input device 200 relative to the support surface. If the input device is oriented with the bottom surface 218 facing upward, the signals of the optical sensor 210 can be used for other purposes, such as determining the presence, movement, or texture of a user object within range of the optical sensor 210. In some embodiments, the signals can therefore correspond to a finger sensor or fingerprint sensor when the optical sensor 210 faces upward, but the signals of the optical sensor 210 can correspond to mouse cursor movement when the optical sensor 210 faces downward.

The optical sensor 210 can comprise a light source and a light detector to detect the presence, movement, or position of a reflective surface. For instance, the optical sensor 210 can comprise a light-emitting diode (LED) and an array of photodiodes to detect movement of the input device relative to a tracking or textured support surface. In some embodiments, the optical sensor 210 can comprise a highly compact size, such as by being In some embodiments, multiple optical sensors 210 can be employed to detect different types of inputs or objects. See also FIGS. 4 and 5. In some embodiments, the optical sensor 210 can be referred to as an electronic position sensor, and the data transduced by the optical sensor can be processed to produce an electronic position signal that indicates a position or relative movement of the removable input device 200.

The battery 212 can be an energy storage device configured to provide energy to the control unit 206 and other electronic components of the input device 200. The battery 212 can be connected to a set of contacts (see FIGS. 9, 11, 12, 13, and 15) or a coil (see FIG. 14) to provide charge to the battery 212 when it is mounted or attached to the keyboard 102.

The magnetic structure 216 can comprise a magnet (e.g., a permanent magnet or electromagnet) or magnetic material (e.g., a ferrous material) configured to attract or be attracted to a magnetic structure external to the housing 202. See also FIGS. 9-10, 14, and 15. The magnetic structure 216 can therefore be used as part of a system of parts that hold or attract the input device 200 to the keyboard 102 or subcomponents thereof. In some embodiments, the magnetic structure 216 can be used as a biasing apparatus configured to apply a magnetic force to the input device 200 to push it away from another magnetic structure. See also FIG. 14.

Figure 4:
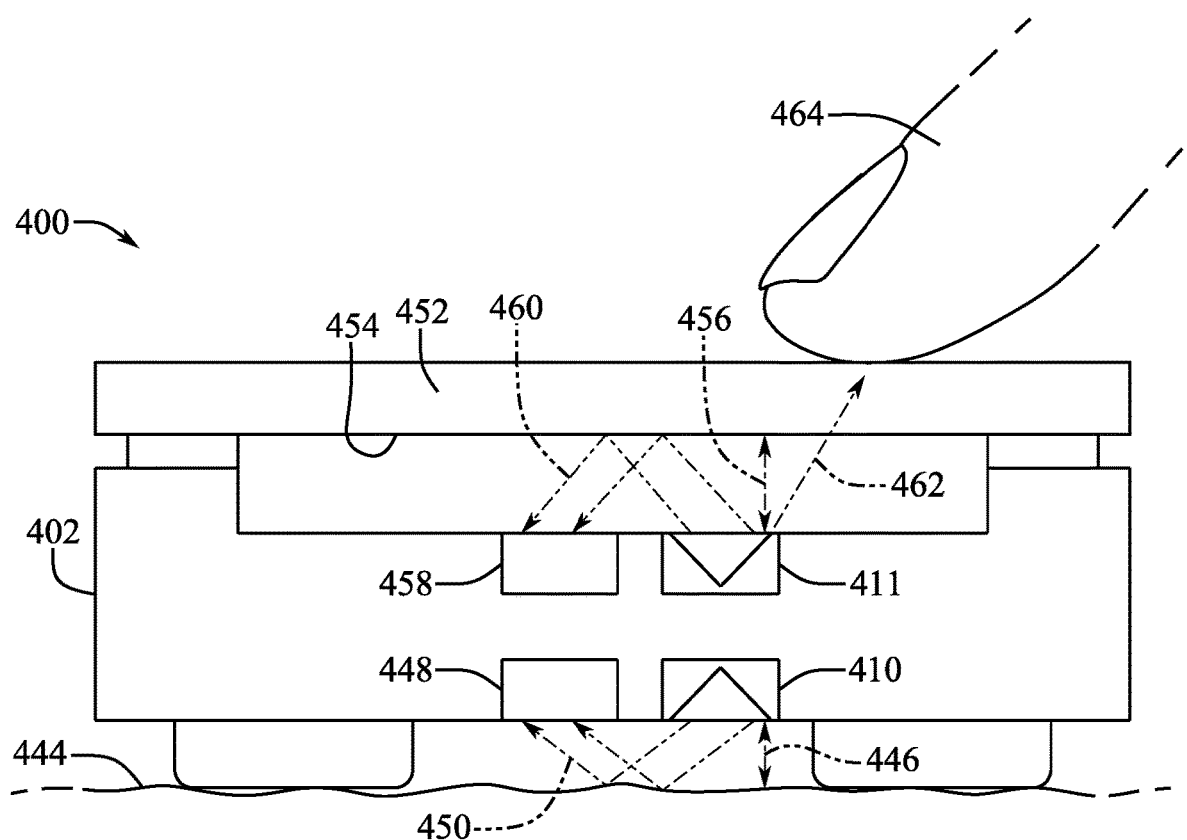
FIG. 4 shows a simplified side section view of an alternative embodiment of a removable input device.

FIG. 4 shows a diagrammatic side view of an input device 400 according to another embodiment of the present disclosure. The input device 400 can be an alternative to the input device 200 and can have many similar features and functions described in connection with input device 200. In this case, the input device 400 has a housing 402 containing multiple optical transducers 410, 411. One optical transducer 410 can be configured to both emit electromagnetic radiation (e.g., infrared or visible light) and sense the reflection of that light from a support surface 444, as indicated by arrow 446. This transducer 410 can therefore be referred to as an input/output transducer that is the source of the signal that it is measuring or detecting. In some alternative embodiments, the optical transducer 410 can emit light that is reflected and sensed by a second optical transducer 448, as indicated by arrow 450. In this case, the transducer 410 can be an emitter and the second transducer 448 can be a receiver or detector. The optical transducer(s) 410 (or 410 and 448) can therefore be used to monitor and track movement of the input device 400 across the support surface 444 as it tracks and senses changes in the optical signals along light paths 446 or 450.

Another optical transducer 411 can be configured to direct light away from the support surface 444, such as light directed upward toward a button pad 452 of the input device 400. Here, the transducer 411 can be an input/output transducer. In some embodiments, the light is emitted toward a bottom surface 454 of the button pad 452, such as toward a bottom surface of a cover plate or touch sensor of the button pad 452. The optical transducer 411 can be configured to receive and detect reflected light from the bottom surface 454 to track movement of the bottom surface 454, such as when a user presses against the button pad 452 and displaces the button pad 452 relative to the housing 402. This type of transducer is indicated with bidirectional arrow along light path 456. In some embodiments, a similar operation can be performed by an optical transducer 411 that emits light toward the bottom surface 454 and a separate transducer 458 that detects the light, as illustrated by light paths 460. Thus, movement of the bottom surface 454 relative to the housing 402 can be detected by changes in the light paths 460 sensed at the separate transducer 458. In either case, the movement of the button pad 452 can be used to trigger a "click" or similar input provided to the input device 200.

In yet another embodiment, the optical transducer 411 can emit a light signal (e.g., along light path 462) configured to pass through the button pad 452. This light can be configured to reflect back to the optical transducer 411 or another light sensor in the input device 200 that detects the presence or position of a user object 464 relative to the button pad 452. In this case, detection or position of the user object 464 can indicate the "click" function rather than the user object applying a force to the button pad 452 or a deflection of the button pad 452. The embodiments described in connection with FIG. 4 can beneficially allow the input device 400 to have minimized internal complexity and moving parts (e.g., a switch 214 or moving stabilizer) and can therefore advantageously reduce the overall size or thickness of the input device 400.

Figure 5:
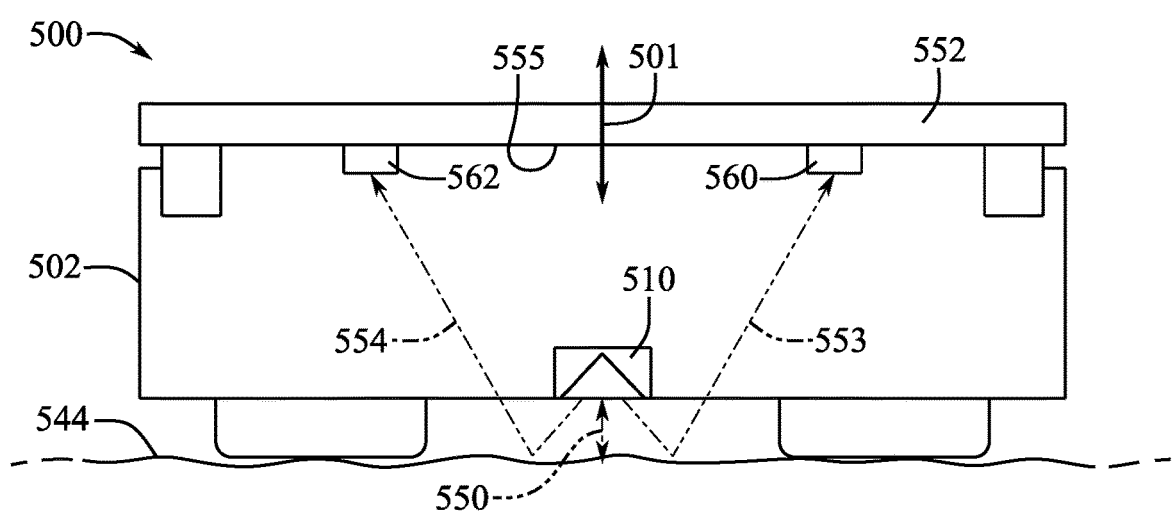
FIG. 5 shows a simplified side section view of an alternative embodiment of a removable input device.

FIG. 5 shows yet another embodiment of an input device 500 wherein a button pad 552 is movable relative to a housing 502 (as indicated by arrow 501) and the housing 502 is movable relative to a support surface 544. Thus, the input device 500 can have features and components in common with input device 200. In this case, an optical transducer 510 can emit light substantially vertically downward and perpendicular to the support surface 544, as indicated by light path 550, and that light can be detected and received at least in part by the same optical transducer 510. In some embodiments, a second transducer (similar to 448) can receive this signal. This reception of light signal from path 550 can be used to detect and track movement of the housing 502 relative to the support surface 544. Light may also be emitted from the optical transducer 510 at an angle wherein the light is not reflected back to the transducer 510 but is instead reflected around or away from the transducer 510 (or another receiver, e.g., 448), as indicated by light paths 553 and 554. This light can be received and detected by sensors 560, 562 at a bottom surface 555 of the button pad 552. Light reflected around or away from the emitter of transducer 510 can be used to detect movement of the button pad 552 relative to the support surface 544 or housing 502 using at least one of the sensors 560, 562. Accordingly, a click or button pad 552 deflection can be detected using the same light source as the light source used to detect movement or a pattern in a support surface 544 for the input device 500. This embodiment can therefore beneficially reduce the amount of parts needed for the input device 500 to perform basic functions of a pointing device, namely, two-dimensional position tracking and receiving a "click" or button-press input.

Figure 6:
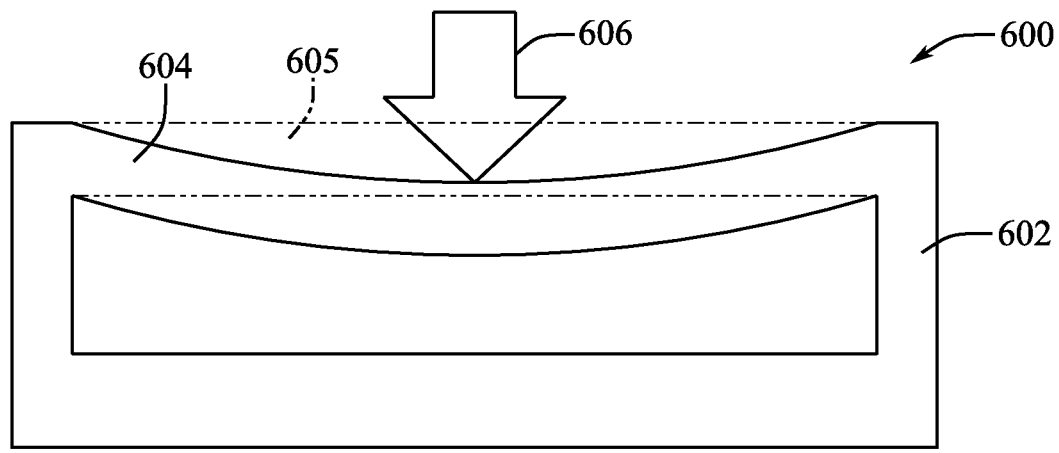
FIG. 6 shows a simplified side section view of an alternative embodiment of a removable input device.

FIG. 6 shows a further embodiment of an input device 600 having a housing 602 with an at least partially deflectable or resilient portion 604. As indicated in connection with input devices 200, 400, and 500, movement or translation of a top button or button pad can be detected as a "click" or button-press input. In some cases, this means the entire top button or button pad translates along an axis of motion (e.g., as supported by a stabilizer 242). In an embodiment such as input device 600, the button-press input can be provided by deformation of the deflectable or resilient portion 604 of the housing 602. For instance, a top portion of the housing 602 can comprise a flexible material (e.g., rubber, polymer, or thin metal layer) configured to buckle or bend from a first shape configuration (shown by 605) to a second shape configuration (shown by 604) in response to a downward force 606 on its outer surface. This bending or flexure movement of the resilient portion 604 can be detected by strain gauges, light-based position sensors, deflectable switches, and similar devices. Thus, a button-press input for the input device 600 can be provided by deflecting the outer surface of the input device 600. Additionally, if the input device 600 is attached or mounted to a keyboard or other support structure, the deflection or bending of the resilient portion 604 can be sensed and registered as a key-based typing input at the resilient portion 604. Thus, rather than deflecting the entire input device 600 or an entire subcomponent of the input device 600 (e.g., top button 204), a portion of a subcomponent the input device 600 can collapse, bend, or deflect to provide a key-based typing input.

Figure 7:
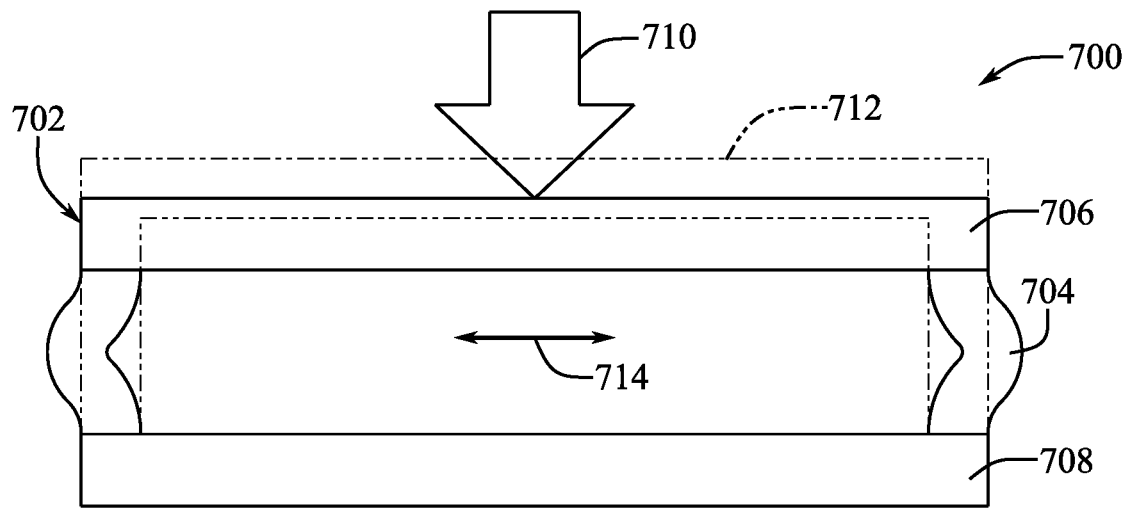
FIG. 7 shows a simplified side section view of an alternative embodiment of a removable input device.

FIG. 7 shows another example embodiment of an input device 700 having a housing 702 with an at least partially deflectable or resilient portion 704. As indicated in connection with input devices 200, 400, and 500, movement or translation of a top button or button pad can be detected as a "click" or button-press input. Input device 700 shows that an input device can have a top pad or plate 706 that is translatable relative to a bottom pad or plate 708 separated by the resilient portion 704. In this case, application of a downward force 710 to the top plate 706 can cause deformation, bending, or buckling in the resilient portion 704 to move the top plate 706 from a default or at-rest position 712 to a second, lower position (indicated by 706). The resilient portion 704 can reduce its height by compression or outward (or inward) buckling or bending. Accordingly, the deflection of the top plate 706 can be registered as a key-based typing input when the input device 700 is in a first configuration and can be registered as a button-press or "click" input when in a second configuration.

Additionally, in some embodiments the input device 700 can be enabled to allow horizontal movement of the top plate 706 relative to the bottom plate 708, as indicated by arrow 714. In this case, the top plate 706 can move horizontally across relative the bottom plate 708 while remaining substantially parallel to the bottom plate 708. The horizontal position of the top plate 706 can be tracked relative to the bottom plate 708. In some embodiments, the flexure of the resilient portion 704 can be tracked to determine the amount of horizontal offset of the top plate 706 relative to the bottom plate 708. Thus, a user object on the top plate 706 can provide multi-directional input by contacting and sliding the top plate 706 relative to the bottom plate 708. In some embodiments, this input can comprise a directional arrow input (e.g., up, down, left, and right arrows) or input to move a cursor or other pointer indicator (e.g., a text bar) on a display screen. In some embodiments, the vertical and horizontal positions of the top plate 706 relative to the bottom plate 708 can be tracked to detect or provide multiple types of simultaneous inputs or inputs in three dimensions. In some embodiments, the position or movement of the top plate 706 can be measured by measurement of a capacitance between the top and bottom plates 706, 708. Furthermore, in some embodiments the resilient portion 704 can comprise an elastically deformable material, wherein releasing pressure on the top plate 706 causes the top plate 706 to spring back into a default position (e.g., 712) relative to the bottom plate 708. In this sense, the top plate 706 can be operated similar to a joystick or pointing stick ("eraser head") pointing device that tends to assume a default, central position when input forces on the device are released or reduced.

Figure 8:
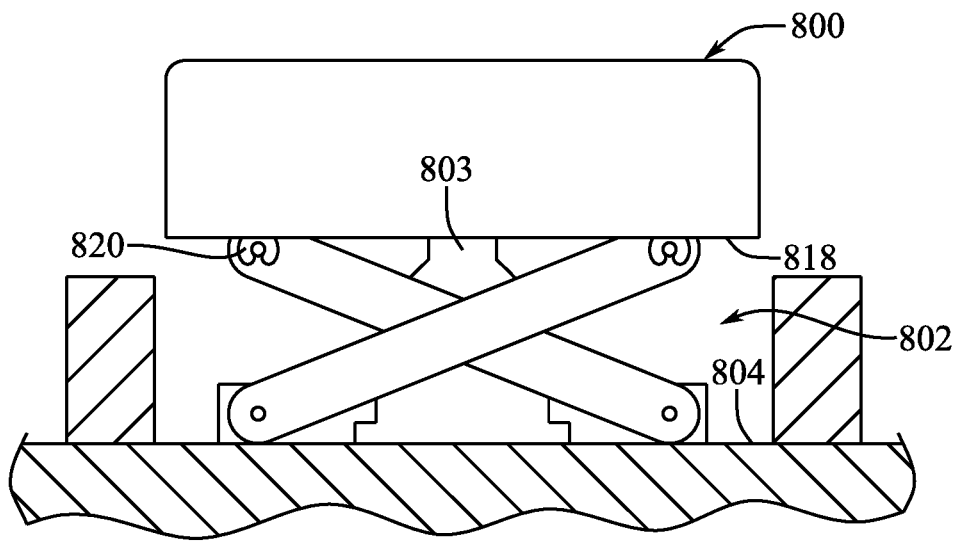
FIG. 8 shows a simplified side section view of an alternative embodiment of a removable input device on a base surface and support structure.

FIG. 8 is a diagrammatic side view of an input device 800 positioned on a support structure 802 that is attached to a chassis or base structure 804 of a keyboard (e.g., 102). The input device 800 may also have a switch 803 positioned between its bottom surface 818 and the base structure 804. The input device 800 can be an input device such as described in connection with FIGS. 1 and 2-7. The support structure 802 can be a key stabilizer, a movement mechanism or a switch such as a scissor mechanism, a butterfly hinge, a collapsible dome switch, similar devices, or combinations thereof. The input device 800 can have a bottom surface 818 at which a connector apparatus 820 is configured to mechanically attach to at least part of the support structure 802. The connector apparatus 820 can comprise a hinge or mechanical interlock to prevent the input device 800 from falling off of the support structure 802 while it is attached to the keyboard. In some embodiments, the connector apparatus 820 can join the input device 800 to the support structure 802 by magnetic attraction. Thus, the input device 800 can operate as a keycap, wherein pressing on the input device 800 causes the input device 800 to translate downward toward the base structure 804 and to collapse or bend the support structure 802 and switch 803. This translation can result in key-based typing input being detected by a controller of the keyboard or control unit 206. The connector apparatus 820 can alternatively be disconnected, wherein the input device 800 is separated from the support structure 802 to be used remotely from the keyboard, as described elsewhere herein.

Figure 9:
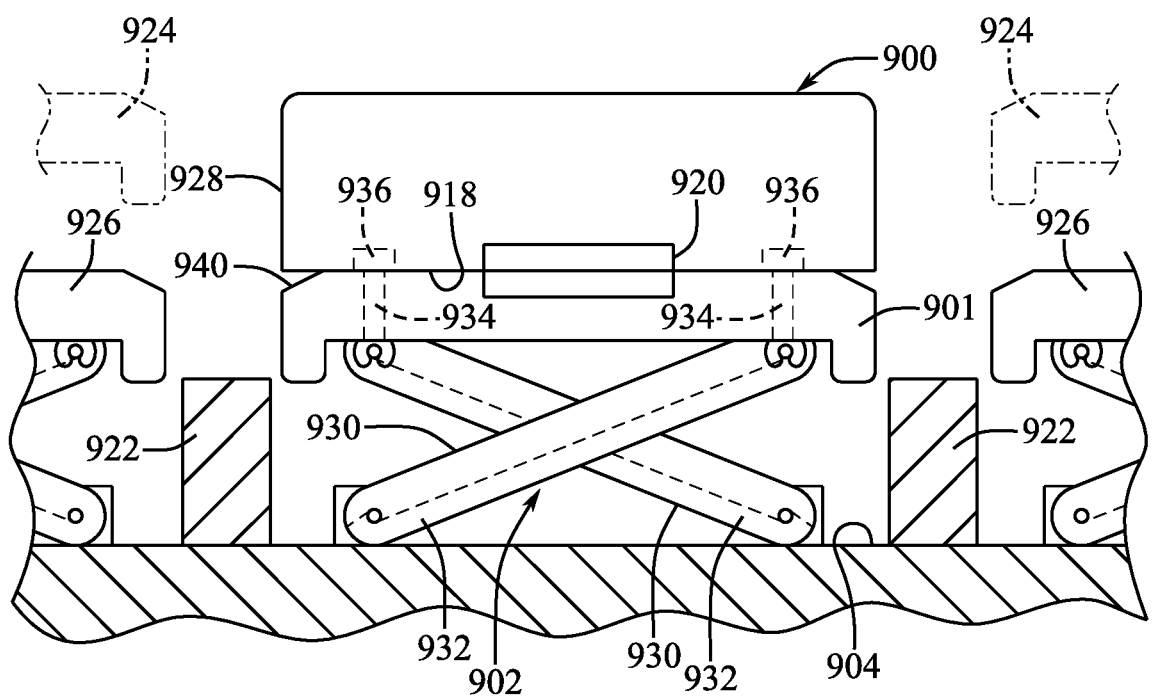
FIG. 9 shows a simplified side section view of an alternative embodiment of a removable input device on a base surface and support structure.

FIG. 9 is a diagrammatic side view of another input device 900 positioned over a subkey 901 and a support structure 902 supporting the subkey 901 over a base surface 904. The input device 900 can therefore have a bottom surface 918 attachable to the subkey 901. A connector apparatus 920 can attach or attract the input device 900 to the subkey 901 so that movement of the input device 900 is synchronized with movement of the subkey 901 when a user presses the input device 900 toward the base surface 904. Movement of the input device 900 with the subkey 901 can produce a key-based typing input signal. The subkey 901 can therefore comprise a keycap-shaped structure with a substantially planar or concave/ridged top surface with outer dimensions substantially equal to the outer dimensions of the maximum width or the base of the input device 900. In some embodiments, the outer dimensions of the subkey 901 can be substantially similar, but narrower than, a space between web structures 922 or other rigid housing members adjacent to the support structure 902 and subkey 901. The input device 900 can be reversibly detachable from, or attachable to, the subkey 901, so when the input device 900 is removed from the subkey 901, the subkey 901 can function as a keycap for the support structure 902 and can receive key-based typing input in the absence of the input device 900.

In some embodiments, the subkey 901 and support structure 902 can support the input device 900 such that the vertical position of the top of the input device 900 is substantially equal to the vertical position of the tops of adjacent keys 924 of the keyboard. When the input device 900 is removed, the top of the subkey 901 can therefore be lower than the tops of the adjacent keys 924. In some embodiments, the subkey 901 or support structure 902 can be reconfigured when the input device 900 is removed so that the top of the subkey 901 is positioned at a substantially equal height as the adjacent keys 924. In yet other embodiments, the subkey 901 has a top surface configured to be at the same vertical height as adjacent keys 926, and the input device 900 protrudes above the adjacent keys 926 when attached to the subkey 901.

The connector apparatus 920 can comprise a magnetic structure configured to keep the input device 900 attached to the subkey 901 in a first configuration wherein the input device 900 and subkey 901 are used to provide key-based typing input. The connector apparatus 920 can comprise a first component in or on the input device 900 and a second component in or on the subkey 901, wherein the two components are magnetically attracted to each other and retain the input device 900 to the subkey 901. The connector apparatus 920 can also horizontally align the input device 900 and subkey 901. In some embodiments, the input device 900 can be horizontally movable relative to the subkey 901, wherein pushing on a lateral side surface (e.g., 928) can move the input device 900 horizontally across the top surface of the subkey 901. For example, a user can grasp the input device 900 to move the input device 900 laterally in two directions (left/right and up/down) relative to the subkey 901. The connector apparatus 920 can permit this relative lateral movement while also biasing the input device 900 back to the position shown in FIG. 9 so that the input device 900 moves in a manner comparable to a joystick or pointing stick pointing device that tends to assume a default, central position when input forces on the input device 900 are released or reduced.

FIG. 9 also shows how the support structure 902 can comprise one or more movable or pivotable arms 930 that connect the base surface 904 to the subkey 901. One or more of the arms 930 can comprise a conductive structure 932 that provides an electrically conductive path between the base surface 904 and the subkey 901. The conductive structure 932 can be configured to provide the conductive path throughout a cycle of motion of the subkey 901 relative to the base surface 904, such as while the arm 930 rotates or translates in response to a key press on the input device 900 or subkey 901. The conductive structure 932 can also stiffen the support structure 902. The subkey 901 can also comprise at least one conductor 934 electrically connecting the conductive structure 932 to at least one conductor 936 on the input device 900. The input device 900 can therefore be electrically connected to a source of electrical energy or a path for electronic communication and data in the base surface 904. Accordingly, electrical charge can be provided to the input device 900 via the conductors 932, 934, 936 and structures in the base surface 904. This can beneficially power the input device 900 for operation while mounted to the subkey 901 or charge a battery 212 therein for operation while disconnected from the subkey 901. Similarly, conductive structure 932 can be provided in the support structure 802 and can provide a path for electrical charge or communication to an input device (e.g., 800) directly mounted to the support structure 802. Additional examples of charging and electrical communications features are described below in connection with FIGS. 11-15.

Figure 10:
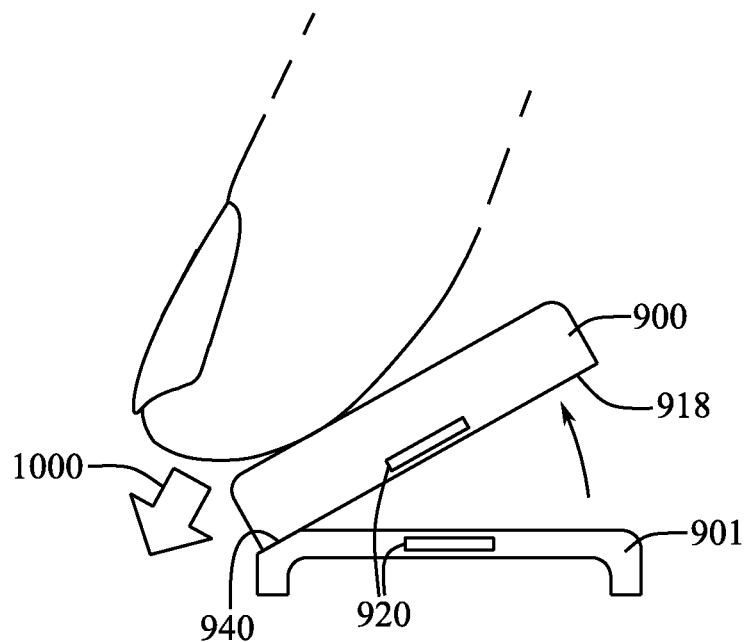
FIG. 10 shows a simplified side view of an alternative embodiment of a removable input device on a subkey.

FIG. 9 also shows that the subkey 901 can comprise an angled top edge portion 940. When the input device 900 is attached to the top surface of the subkey 901, a small gap or open space can be positioned between the input device 900 and the subkey 901 at the angled top edge portion 940, as shown in FIG. 9. When the top surface of the input device 900 is pressed down under normal conditions, the connector apparatus 920 can keep the input device 900 held to the subkey 901. FIG. 10 illustrates that in some embodiments, application of a downward or diagonally downward-oriented force (e.g., along arrow 1000) on the input device 900 can induce rotation of the input device 900 relative to the subkey 901 into the space or gap at the angled top edge portion 940 of the subkey 901. This pivoting movement of the input device 900 relative to the subkey 901 can overcome the attraction or interlocking forces between attachment elements (e.g., magnetic elements) used in the connector apparatus 920, thereby easing the separation of the input device 900 from the subkey 901.

The support structure 902 can in some cases be operable as a push-push mechanism. Thus, in some embodiments, the push-push mechanism can be operated based on deflection to make the subkey 901 have an at-rest position at the height of keycaps of the keys 926 or to make the subkey 901 have an at-rest position at the height of keycaps of the keys 924. For instance, if the input device 900 or subkey 901 deflects relative to the base surface 904 below a threshold distance of downward displacement, the input device 900 and subkey 901 can remain in the retracted position (i.e., the subkey 901 is horizontally aligned with adjacent keys 926) when an inward-directed force is removed from the input device 900. If the input device 900 or subkey 901 deflects relative to the base surface 904 at or above the threshold distance of downward displacement, the input device 900 or subkey can be unlocked and extend from the housing (e.g., to the position where the subkey 901 is aligned with adjacent keys 924).

FIG. 10 also shows that the connector apparatus 920 can be positioned enclosed or encapsulated by a housing or outer surface of the input device 900 or subkey 901, whereas FIG. 9 shows the parts of the connector apparatus 920 diagrammatically shown exposed at the outer surfaces thereof.

Figure 11:
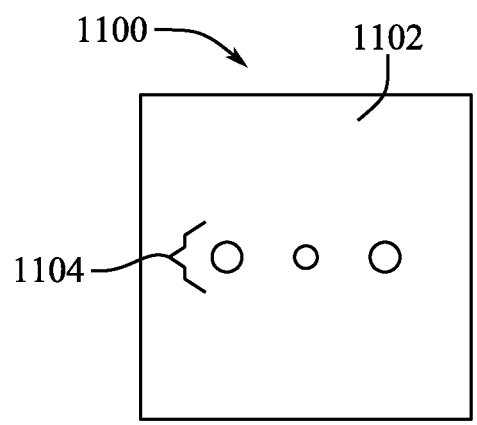
FIG. 11 shows a simplified bottom view of an embodiment of a removable input device.

FIG. 11 shows a diagrammatic bottom view of an input device 1100 having a bottom surface 1102 with a set of conductors 1104 configured to face downward when the input device 1100 is attached to a subkey (e.g., 901), a support structure (e.g., 802), an enclosure (e.g., in recess 130), or another conductor below the bottom surface 1102. In some embodiments, the input device 1100 can comprise at least three conductors 1104, wherein one conductor is configured to provide a voltage source to the input device 1100, a second is configured to provide a ground source to the input device 1100, and a third is configured to provide a data communications path to the input device 1100. The set of conductors 1104 can be vertically centered on the input device 1100 in a manner allowing the input device 1100 to be reversibly connected to a set of three contacts below the input device 1100. For example, the input device 1100 can be rotated 180 degrees between two different orientations configured to engage all three of the conductors 1104.

Figure 12:
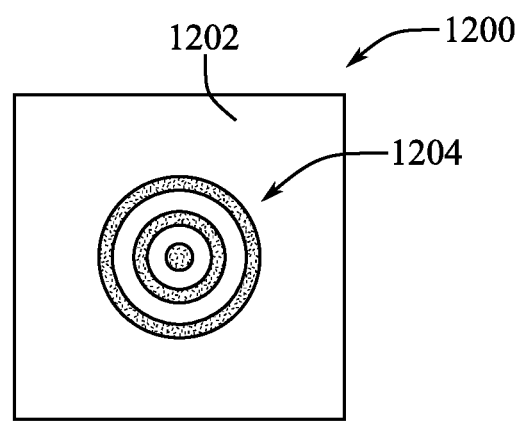
FIG. 12 shows a simplified bottom view of an alternative embodiment of a removable input device.

FIG. 12 shows a similar diagrammatic bottom view of an input device 1200 having a bottom surface 1202 with a set of conductors 1204 configured to face downward when the input device 1200 is attached to a subkey, support structure, enclosure, or another conductor below the bottom surface 1202. The input device 1200 can have three concentric conductors 1204 that are separated by rings of insulating material. In this case, the three conductors 1204 can provide the same types of connections as the set of conductors 1104 described above but they are also rotatable through additional possible orientations relative to three contacts below the bottom surface 1202. In an example embodiment, the set of conductors 1204 can be rotated between four different orientations that are each 90 degrees rotated from the next orientation. Thus, the input device 1200 can be more easily placed onto a subkey (e.g., 901) or other support member and can provide an electrical interface without having to pay as much attention to the orientation of the input device 1200. This can be especially beneficial when a circular input device is used (e.g., the embodiment of FIG. 3).

Figure 13:
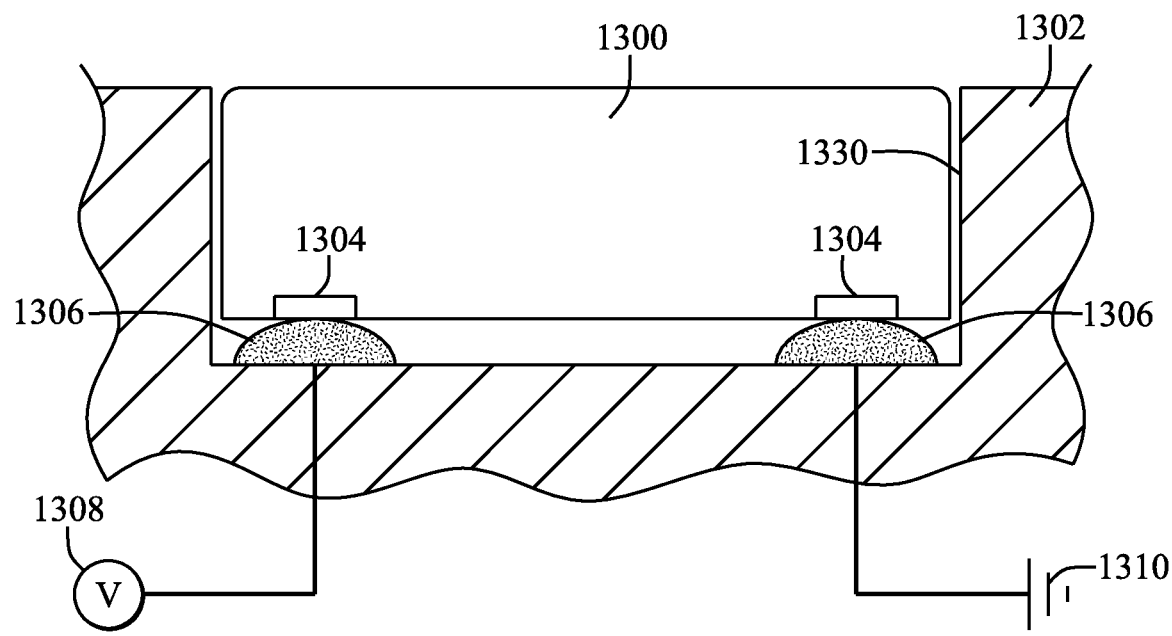
FIG. 13 shows a simplified side section view of a removable input device in an enclosure recess.

FIG. 13 shows a diagrammatic side view of an input device 1300 positioned in a recess 1330 of an enclosure 1302. The input device 1300 can comprise a set of conductors 1304 exposed at a bottom surface thereof that are configured to contact a set of conductive deflectors 1306 in the recess 1330. The conductive deflectors 1306 can be respectively electrically connected to a voltage source 1308 and to ground 1310 that are in or connected to the enclosure 1302. The conductive deflectors 1306 can comprise an elastically compressible or deflectable material configured to deform when a downward force is applied to the input device 1300. For example, the conductive deflectors 1306 can comprise a conductive rubber or polymer material configured to compress when pressure is applied by the bottom surface of the input device 1300. Accordingly, the conductive deflectors 1306 can provide electrical communication with the input device 1300 (e.g., for charging) while the input device 1300 is being used for key-based typing input and is being displaced or translated relative to the recess 1330. Additionally, the flexibility of the conductive deflectors 1306 can help ensure that the deflectors 1306 and the conductors 1304 remain electrically engaged (i.e., sufficiently in contact with each other) while the input device 1300 is in the recess 1330, whether or not the input device 1300 is moving. For example, for an input device having a collapsible body or button configuration (e.g., as shown in FIGS. 6 and 7), the input device can remain in electrical communication with the recess 1330.

In some embodiments, the conductive deflectors 1306 can be positioned horizontally adjacent to the lateral sides of the input device 1300. The conductors 1304 can also face laterally outward to contact and engage the conductive deflectors 1306. In this way, the housing of the input device 1300 can move relative to the recess 1330 while remaining in electrical communication with the deflectors 1306. For example, the amount of contacting surface area between the deflectors 1306 and the conductors 1304 (or vice versa) can be less than the entire possible surface area in which they can come into contact. The conductors 1304 can then move along the deflectors 1306 while remaining in electrical communication with them. See also FIG. 15.

Figure 14:
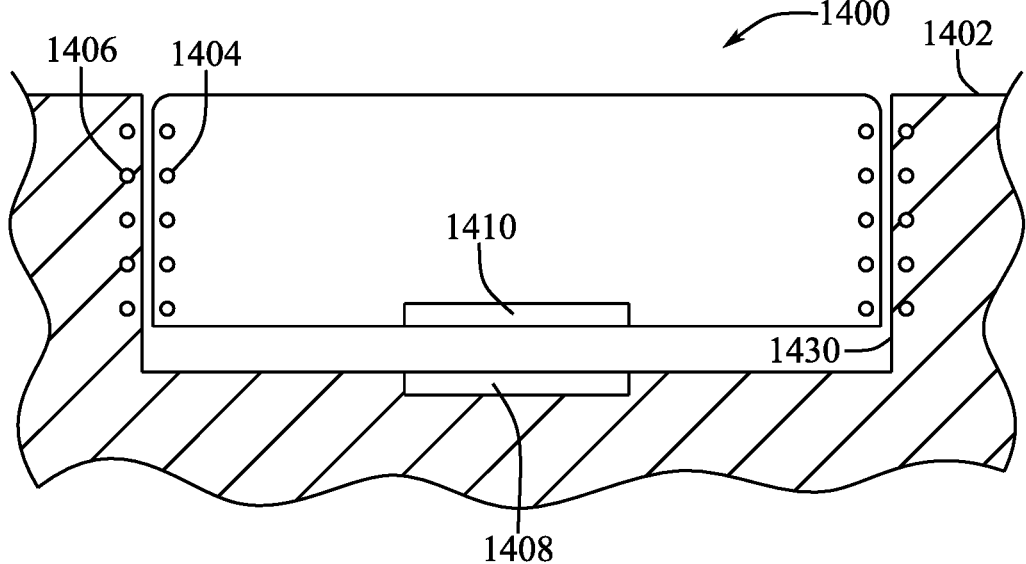
FIG. 14 shows a simplified side section view of an alternative embodiment of a removable input device in an enclosure recess.

FIG. 14 shows another embodiment of an input device 1400 positioned in a recess 1430 of an enclosure 1402. In this case, an input device charging coil 1404 and an enclosure charging coil 1406 can be positioned adjacent to each other when the input device 1400 is in the recess 1430. A series of coil loops for the coils 1404, 1406 are shown in FIG. 14. The enclosure charging coil 1406 can be a transmit coil configured to emit a field that is converted to electrical power by the input device charging coil 1404. The input device charging coil 1404 can therefore receive electrical power via a wireless charging interface with the recess 1430. In this manner, the input device 1400 can be operated and charged without contacting the recess 1430 or another electrical conductor on the keyboard.

FIG. 14 also shows that the input device 1400 can comprise an enclosure magnetic structure 1408 configured to be positioned adjacent to a corresponding input device magnetic structure 1410. In some embodiments, these magnetic structures 1408, 1410 can attract each other to pull the input device 1400 into the recess 1430 and to help retain the input device 1400 therein. In some cases, the magnetic structures 1408, 1410 can repel each other to help remove the input device 1400 from the recess 1430. For example, one of the magnetic structures 1408, 1410 can comprise an electromagnet that can control its polarity to either attract or repel the other magnetic structure, thereby moving the input device 1400 relative to the recess 1430. In one embodiment, a magnetic structure 1408, 1410 can comprise an aluminum-nickel-cobalt alloy that can have its polarity semi-permanently changed to produce a similar switchable magnetic force (attraction or repulsion) effect. In some embodiments, the magnetic structures 1408, 1410 can be configured to repel each other to provide force feedback (i.e., resistance to downward movement) for the input device 1400.

Figure 15:
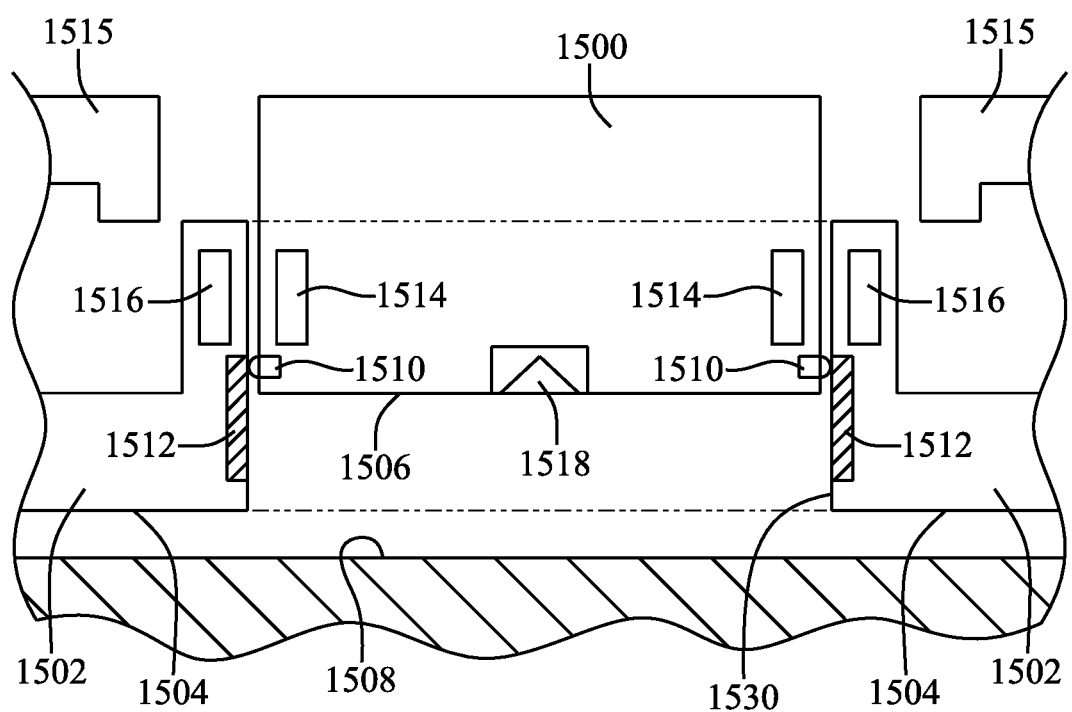
FIG. 15 shows a simplified side section view of an alternative embodiment of a removable input device in an enclosure recess.

FIG. 15 shows another embodiment of an input device 1500 positioned in an enclosure 1502 having a through-hole 1530 opening for the input device 1500. For example, the enclosure 1502 can comprise a bottom plate 1504 with a portion through which the through-hole 1530 extends. The input device 1500 can therefore have a bottom surface 1506 that is exposed to a support surface 1508 below the enclosure 1502. The input device 1500 can vertically translate within the through-hole 1530, such as by moving to a position within or below the broken-line boundary shown in FIG. 15, wherein the bottom surface 1506 is aligned with a bottom surface of the bottom plate 1504 of the enclosure 1502. The input device 1500 can therefore have electrical conductors 1510 that engage electrical pads 1512 on the enclosure 1502 (e.g., on side surfaces of the through-hole 1530). The electrical pads 1512 can have a length exceeding the length of the electrical conductors 1510 so that the input device 1500 can remain in electrical communication with the enclosure 1502 while the input device 1500 moves relative to the enclosure 1502 in the through-hole.

In some embodiments, the input device 1500 and enclosure 1502 can comprise corresponding magnetic structures 1514, 1516 that can be used to help retain the input device 1500 in the through-hole 1530 and help bias the input device 1500 into the position shown in FIG. 15. Accordingly, in some cases, the magnetic structures 1514, 1516 can pull the input device 1500 from a lower position (e.g., as shown in broken lines in FIG. 15) to the position shown in solid lines in FIG. 15 after the input device 1500 is pressed downward. In this way, the input device 1500 can be operated to receive key-based typing input while positioned in the through-hole 1530. The magnetic structures 1514, 1516 can beneficially also retain the input device 1500 in a position that is substantially similar in height to neighboring keys (e.g., 1515) when the input device 1500 is at rest. Thus, using the input device 1500 among the other keys 1515 can be more comfortable and can result in fewer inadvertent touches or depressions of the input device 1500.

Additionally, in some embodiments, the input device 1500 can comprise an optical sensor 1518 configured to face downward from the bottom surface 1506 of the input device 1500. The optical sensor 1518 can direct light toward the support surface 1508 while the input device 1500 is still being retained in the through-hole 1530. Accordingly, the optical sensor 1518 can be used to track movement of the input device 1500 or enclosure 1502 relative to the support surface 1508. Accordingly, the entire enclosure 1502 (with the input device 1500 mounted thereto) can be moved to provide pointing device-like input to a controller or processor. Additionally, the optical sensor 1518 can be used to detect vertical movement of the input device 1500, such as when key-based typing input is provided by pressing on and moving the input device 1500 in the through-hole 1530.

Furthermore, in some cases the input device 1500 can be pushed through the through-hole 1530 to release the input device 1500. In that case, pressing the input device 1500 to a first distance through the through-hole 1530 (e.g., to the position shown in broken lines) can allow the input device 1500 to return to a raised, mounted position (e.g., the position shown in solid lines) when the downward input force is released. Thus, the input device 1500 can remain locked to the enclosure 1502. The input device 1500 can return to the raised position due to an upward biasing force applied by the magnetic structures 1514, 1516. When the input device 1500 is deflected to a distance through the enclosure 1502 that is at or above a threshold distance, such as by moving it below the position shown in broken lines in FIG. 15, the input device 1500 can be unlocked from the enclosure 1502 when the input force is released, and the input device 1500 can then pass completely through the through-hole 1530 to a position separated from the enclosure 1502. In this case, the attraction between the magnetic structures 1514, 1516 can be overcome sufficient for the input device 1500 to no longer be retained in place by the magnetic structures 1514, 1516.

Figure 16:
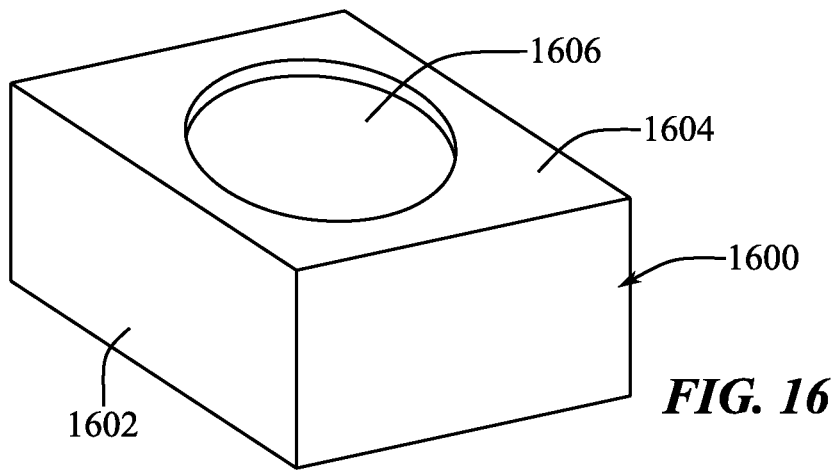
FIG. 16 shows a simplified isometric view of an embodiment of a removable input device.
Figure 17:
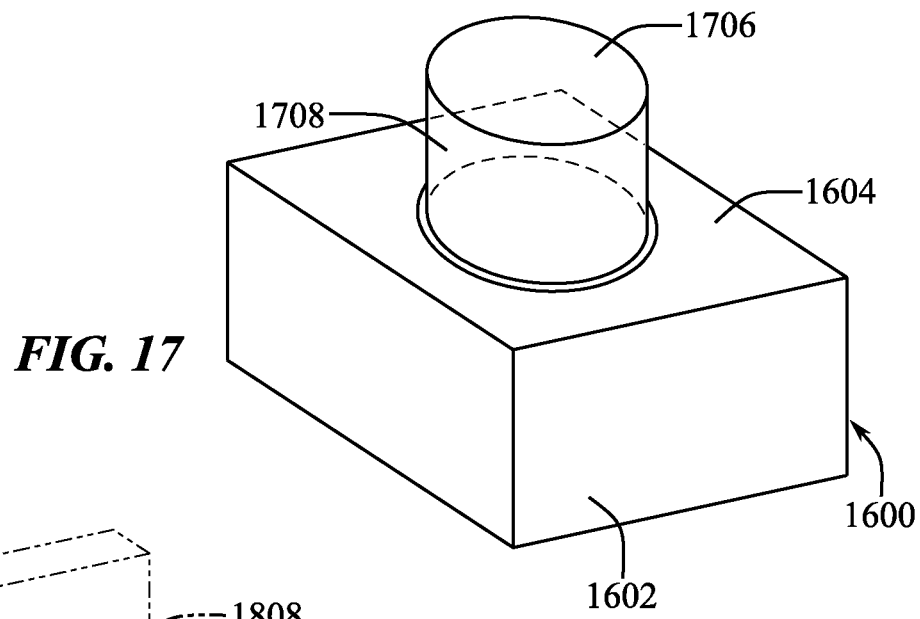
FIG. 17 shows a simplified isometric view of an alternative embodiment of a removable input device.

FIG. 16 shows a simplified view of another embodiment of an input device 1600. In this case, the input device 1600 can include a housing 1602 with an outer surface 1604 having a central feature 1606. In some embodiments, the central feature 1606 is an optical or touch sensor configured to detect the presence, surface features, or movement of a user object external to the outer surface 1604. Thus, a user can provide input to the input device 1600 by approximating a user object to the central feature 1606 and allowing the sensor to perceive the user object. In one example, the central feature 1606 can be a fingerprint scanner. When the input device 1600 orientation is turned over so that the outer surface 1604 faces downward instead of the upward direction shown in FIG. 16, the central feature 1606 can be used as a tracking or position locating device, such as an optical sensor of a mouse or similar pointing device.

In some embodiments, the input device 1600 can comprise a central feature 1606 that comprises a "push-push" mechanism. In this case, when the central feature 1606 is in the state shown in FIG. 16, application of an inward-directed force against the central feature 1606 can release a mechanism within the housing 1602 and can allow the central feature 1606 to translate out to the position shown in FIG. 17 (i.e., central feature 1706). Application of an inward-directed force against the central feature 1706 while in the position shown by FIG. 17 can cause the mechanism to re-latch to the position shown in FIG. 16. Accordingly, a user can push the central feature 1606 to release and push the central feature 1706 to retract the central feature 1606. Extending the central feature 1606/1706 from the housing 1602 can provide additional surface area to grasp the input device 1600. Additionally, the extended central feature 1706 can provide additional side surface area 1708 that allows a user to manipulate the input device 1600 by rotating or deflecting the input device 1600 via pressure against the side surface area 1708, similar to a joystick or pointing stick pointer device.

Figure 18:
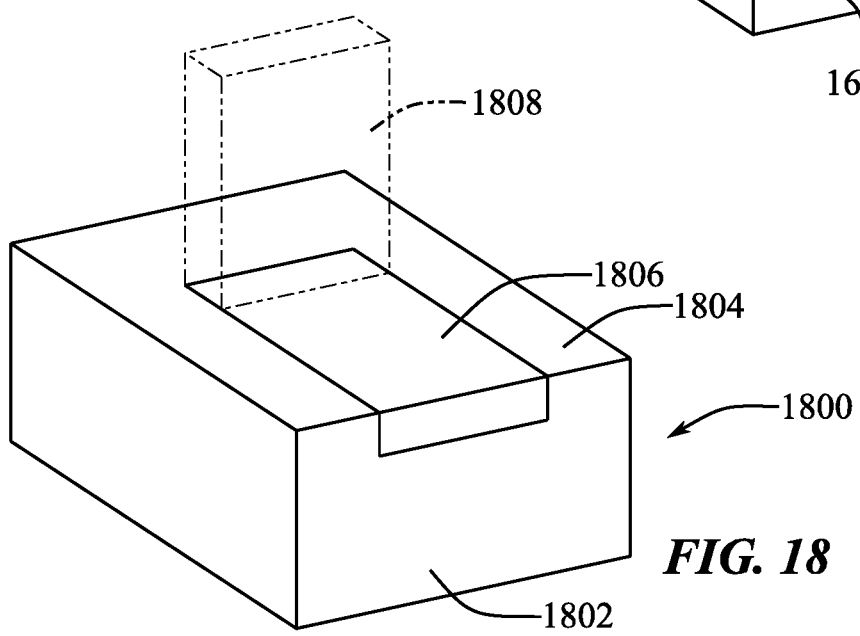
FIG. 18 shows a simplified isometric view of an alternative embodiment of a removable input device.

FIG. 18 shows a similar embodiment of an input device 1800 wherein a central feature 1806 of an outer surface 1804 is pivotable from a flush or horizontal position (shown in solid lines) to an extended or vertical position (shown in broken lines). While in the extended position 1808, the central feature can provide additional height and side surface area for grasping or turning the input device 1800.

Figure 19:
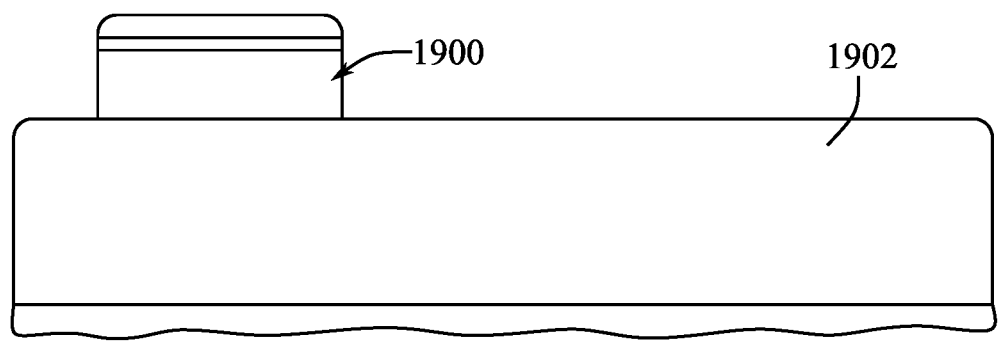
FIG. 19 shows a simplified side view of a removable input device on a support body.

FIG. 19 shows yet another embodiment of an input device 1900 of the present disclosure. In FIG. 19, the input device 1900 is shown mounted to a handheld support body 1902 that is separate from a keyboard. Thus, the input device 1900 can be removed from its host keyboard and mounted to a separate support body 1902 when it is to be used in a separated condition. While the input device 1900 is mounted to the support body 1902, the input device 1900 can be easier to grasp and move in a user's hand. In some embodiments, the support body 1902 can comprise an attachment feature to help retain the input device 1900 to the support body 1902, such as a magnetic structure or mechanical latch to keep the input device 1900 in place while the support body is moved by a user. In this embodiment, position tracking of the input device 1900 can be provided by an inertial measurement unit (e.g., 208) if the support body 1902 renders an optical sensor (e.g., 210) inoperative or if the input device 1900 lacks an optical sensor.

The input devices 104, 106, 108, 200, 400, 500, 600, 700, 800, 900, 1100, 1200, 1300, 1400, and 1500 and their related keyboards, supports, and enclosures disclosed herein can share features or have interchangeable features. Accordingly, a feature of one input device can be used in another input device where that feature is not shown or can be used in addition to similar features shown in the other input device. In this manner, the disclosure related to each input device or other related component disclosed herein should be understood as being exemplary of features that can be implemented in any of the input devices or their respective related components, as will be understood by those having ordinary skill in the art.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computer input device, comprising:
   a housing;
   a set of key switch mechanisms positioned in the housing;
   a removable key structure operable between a first configuration positioned within a receptacle in the housing and a second configuration detached from the housing, the removable key structure comprising a position sensor configured to detect movement of the removable key structure; and
   wherein in the first configuration, the removable key structure is operable to provide a key-based typing input;
   wherein in the second configuration, the removable key structure is operable as a computer pointing device using the position sensor by detecting movement of the removable key structure.

2. The computer input device of claim 1, wherein the removable key structure further comprises an input transducer to detect a user touch on, or movement of, a top surface of the removable key structure.

3. The computer input device of claim 1, wherein the removable key structure is positioned in a socket in the housing in the first configuration.

4. The computer input device of claim 1, wherein the removable key structure comprises an internal key switch mechanism and a second housing, wherein the internal key switch mechanism is deflectable relative to the second housing, the second housing being detachable from the housing.

5. The computer input device of claim 1, wherein the removable key structure comprises a body portion having an expandable side feature.

6. The computer input device of claim 1, wherein the removable key structure is detachable from a key switch mechanism of the set of key switch mechanisms.

7. The computer input device of claim 1, wherein the removable key structure is detachable from a keycap connected to the housing.

8. The computer input device of claim 1, wherein the removable key structure further comprises an internal energy storage device, wherein the internal energy storage device is configured to receive energy in the first configuration.

9. The computer input device of claim 1, wherein the removable key structure further comprises a bottom surface and a spacer configured to separate the bottom surface from a support surface when the removable key structure is in the second configuration.

10. A computer input system, comprising:
    a base structure;
    an input device having a housing containing an optical sensor operable to output an electronic position signal of the housing;
    a support structure to connect the housing of the input device to the base structure;
    wherein in a first configuration, the housing of the input device is movable between an upward-biased first position relative to the base structure while retained to the support structure, and a depressed second position relative to the base structure while retained to the support structure;
    wherein in a second configuration, the housing of the input device is detached from the support structure and the input device is operable to output the electronic position signal.

11. The computer input system of claim 10, further comprising a switch, wherein a force applied to the top surface of the input device actuates the switch upon depression of the input device relative to the base structure.

12. The computer input system of claim 10, wherein the input device and the support structure are coupled by a magnetic structure attracting the input device to the support structure.

13. The computer input system of claim 10, wherein the support structure comprises a key stabilizer reversibly attachable and detachable to the input device.

14. The computer input system of claim 10, wherein the support structure comprises a keycap reversibly attachable and detachable to the input device.

15. The computer input system of claim 10, wherein application of an off-center force to a top surface of the input device separates the input device from the support structure.

16. The computer input system of claim 10, wherein if the input device deflects relative to the base structure below a threshold distance, the input device is locked to the support structure when the force is removed, and if the input device deflects relative to the base structure at or above the threshold distance, the input device is unlocked from the support structure when the force is removed.

17. A computer input system, comprising:
a keyboard apparatus including:
a housing;
a set of key switch mechanisms positioned in the housing; and
a controller in electronic communication with the set of key switch mechanisms; and
an input device removably attachable to the housing among the set of key switch mechanisms, the input device including:
a body;
a sensor positioned in the body;
wherein in a first configuration of the input device, the input device is attached to the keyboard apparatus and the sensor produces a first output registered by the controller as a first input type wherein the first input type includes a key-based typing input;
wherein in a second configuration of the input device, the input device is positioned spaced away from the keyboard apparatus and the sensor produces a second output that is registered by the controller as a second input type, wherein the second input type is an input of a relative movement of the input device.

18. The computer input system of claim 17, wherein the first input type is a position or movement of an appendage of a user relative to the sensor.

19. The computer input system of claim 17, wherein the sensor includes an optical sensor.

20. The computer input system of claim 17, wherein the second input type is a mouse click.

21. The computer input device of claim 1, wherein the removable key structure is positioned among the set of key switch mechanisms with spacing equal to adjacent keys of the set of key switch mechanisms.

* * * * *